Figure 1:
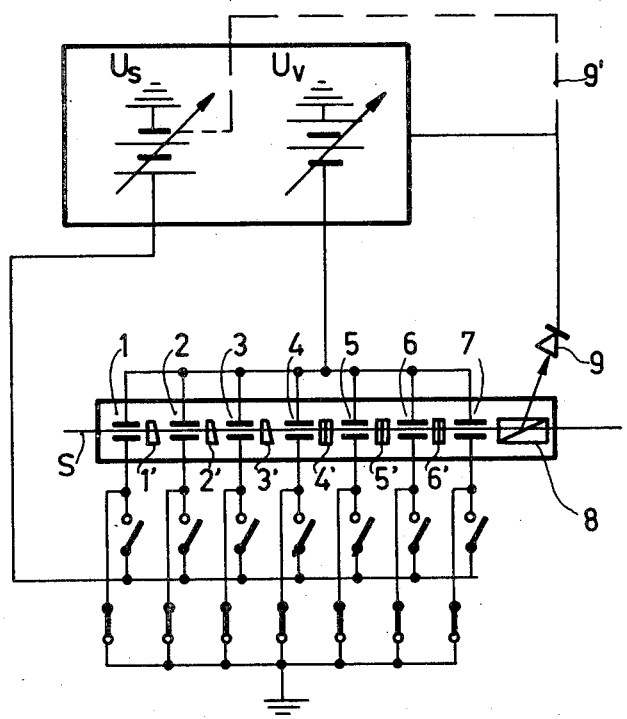

United States Patent
Rahlff

[11] 3,819,939
[45] June 25, 1974

[54] DIGITAL LIGHT DEFLECTOR

[75] Inventor: Manfred Rahlff, Hamburg, Germany

[73] Assignee: U.S. Philips Corporation, New York, N.Y.

[22] Filed: Sept. 13, 1972

[21] Appl. No.: 288,594

[30] Foreign Application Priority Data
  Sept. 15, 1971   Germany............................ 2146123

[52] U.S. Cl. ................................ 250/225, 350/150
[51] Int. Cl. ............................................... G01n 7/00
[58] Field of Search ........... 350/150, 151, 157, 159; 250/225

[56] References Cited
UNITED STATES PATENTS

| | | | |
|---|---|---|---|
| 3,272,988 | 9/1966 | Bloom | 250/225 |
| 3,290,619 | 12/1966 | Geusic | 350/150 |
| 3,532,891 | 10/1970 | Simmons | 350/150 |
| 3,535,020 | 10/1970 | Schmidt | 350/150 |
| 3,588,749 | 6/1971 | Meyer | 350/150 |
| 3,632,193 | 1/1972 | Kusters | 350/150 |
| 3,687,555 | 8/1972 | Yamamoto | 250/225 |

*Primary Examiner*—James W. Lawrence
*Assistant Examiner*—D. C. Nelms
*Attorney, Agent, or Firm*—Frank R. Trifari; Simon L. Cohen

[57] ABSTRACT

A digital light deflector is described which comprises a plurality of deflector stages which each include a polarization switch and a birefringent element. It is shown that the stray light can be determined by introducing, behind the last deflector stage, an additional polarization switch and a polarization separating element and also a radiation-sensitive detector which converts the stray light into an electric signal for controlling the switching voltage of the polarization switches.

6 Claims, 3 Drawing Figures

DIGITAL LIGHT DEFLECTOR

The invention relates to a digital light deflector comprising a plurality of deflecting stages which each include a polarization switch and a birefringent element.

For various reasons, in such a light deflector part of the light may be deflected in undesirable directions. The light so deflected in undesirable directions shall hereinafter be referred to as "stray light." This is the case, for example, when the light beam which emerges from the polarization switches, for example Kerr cells, does not have the desired state of polarization. Discrepancies in the state of polarization of the light beam may be due to fluctuations in the voltages set up across the electro-optical polarization switches, to changes in the form of the electric field within these switches or to changes in the electro-optical constants of the switches caused by fluctuations of the temperature or by variations in the wavelength. All these variations may be compensated for by varying the voltages to be applied to the polarization switches.

It is an object of the present invention to provide a signal which enables the voltages to be applied to the polarization switches to be adjusted. The apparatus according to the invention is characterized in that in order to determine stray light the last deflector stage is succeeded by an additional polarization switch and a polarization-separating element, and in that the deflector is provided with a radiation-sensitive detector which converts the stray light into an electric signal for controlling the switching voltage of the polarization switches.

Optimum adjustment of the voltages to be applied to the polarization switches is achieved when the intensity of the stray light has a minimum value. The minimum value approaches zero when all the determining parameters are equal to the theoretically required parameters.

Figure 2:
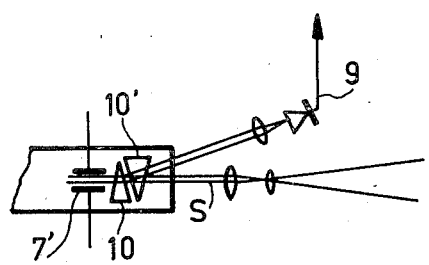
Figure 3:
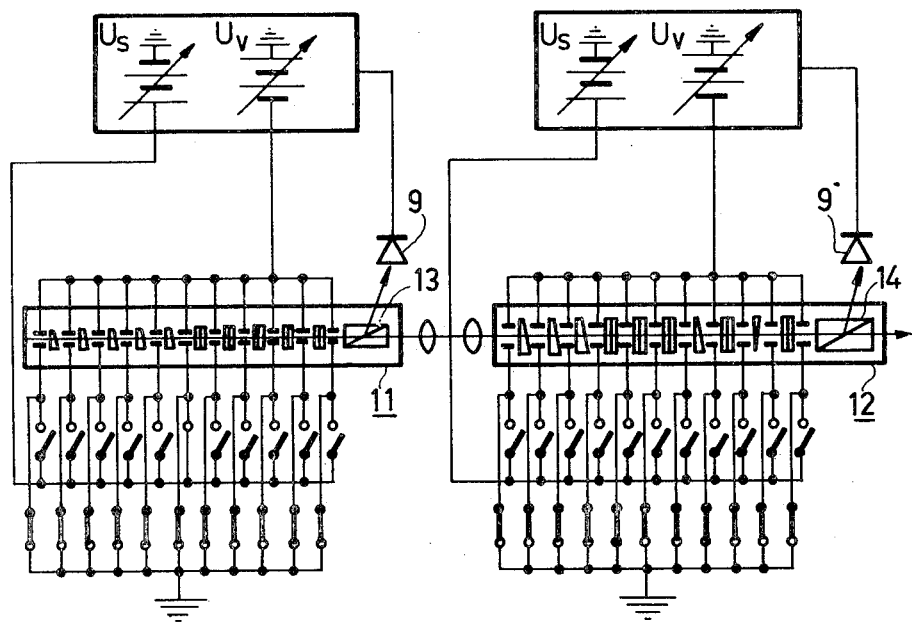

The invention will now be set out more fully with reference to the accompanying diagrammatic drawings, in which:

FIG. 1 shows an apparatus according to the invention which includes a direct-vision polarization prism as the polarization-separating element, FIG. 2 shows a birefringent single prism which serves as a polarization-separating element, and FIG. 3 shows a digital light deflector according to the invention which is split in two units and comprises 20 stages.

Referring now to FIG. 1, there is shown a 6-stage digital light deflector comprising polarization switches 1 to 6 (Kerr cells) and birefringent prisms 1' to 6'. According to the invention the last deflector stage is succeeded by an additional polarization switch 7 and a Glan-Thompson prism 8. When no voltages are set up across any of the polarization switches, the state of polarization of the light beam, for example a laser beam, is not modified and the beam is reflected by the polarization prism 8. A radiation-sensitive detector 9 then receives stray light of maximum intensity. The stray light reaches a minimum value at optimum adjustment of a bias voltage source $U_v$ for the polarization switches.

When the light beam is deflected in different directions the polarization switches 1 to 6 are simultaneously connected in various combinations to a switching voltage source $U_s$. As a result they bring the deflecting units to a given switching condition. When at an arbitrary instant $n$ deflecting units are in the switching condition "1," the plane of polarization of the light beam is rotated through $n$ times 90°. For $n = 0, 2, 4, 6, \ldots$ the stray light of the first order enters the polarizing prism 8 as an ordinary ray and is reflected to the detector 9. For $n = 1, 3, 5, \ldots$ the polarization switch 7 is connected to the switching voltage source $U_s$. Thus it is ensured that always the stray light is reflected by the prism 8 whereas the signal light is transmitted. An incorrect value of the switching voltage gives rise to stray light again. When the bias voltage source $U_v$ is previously adjusted to produce the optimum voltage, the stray light may be used as a measuring quantity for controlling the switching voltage $U_s$, as is indicated by a connection 9'.

FIG. 2 shows a device in which a birefringent single prism 10 is used as a polarizer. A polarization switch 7' is controlled so that the direction of polarization for the beam S remains constant, irrespective of the direction of deflection, so that this beam is always refracted with the same refractive index by the polarizer 10.

The refraction of the signal light is compensated by an isotropic prism 10', so that the system axis only is shifted slightly in a direction parallel to itself. The stray light is directed onto the detector 9 via the compensating prism 10'.

FIG. 3 shows a 20-stage digital light deflector which is split up into two units 11 and 12 and in which the stray light is suppressed. For this purpose the stray light is measured, at a point succeeding the tenth stage in the first unit 11 and at a point succeeding the twentieth stage in the second unit 12. This arrangement enables the voltage sources $U_s$ and $U_v$ to be individually controlled for various deflector stages by means of polarization-separating elements 13 and 14 respectively.

In a further embodiment of the invention the stray light may be separated from the signal light by means of a birefringent parallel plate. Because the plane of polarization of the first-order stray light always is at right angles to the plane of polarization of the signal light, the birefringent parallel plate may be oriented so that either the stray light reaches the critical angle of total reflection and the signal light emerges from the parallel plate owing to refraction or vice versa. The optic axis of the crystal which forms the parallel plate then must be situated either in the plane of polarization of the signal light or in that of the stray light.

What is claimed is:

1. A drift compensator for a digital light deflector of the type wherein a beam of radiation passes through a plurality of energizable radiation deflection stages each including a polarization switch activated by a switching voltage and a birefringent element, the compensator comprising an additional polarization switch in the path of the deflected radiation from the plurality of deflection stages and operable in response to an odd number of radiation deflection stages being energized, a polarization separating element in the path of the radiation passing through the additional polarization switch for spatially separating the portion of the radiation due to stray light from a signal light portion of the beam, and radiation-sensitive detector in the path of the stray light radiation from the birefringent element for providing an electrical signal suitable for controlling the magnitude of the switching voltage of the polarization switches in the digital light deflector.

2. Digital light deflector as claimed in claim 1, wherein the polarization-separating element is a direct-vision Glan-Thompson polarizing prism.

3. Digital light deflector as claimed in claim 1, wherein the polarization-separating element is a birefringent single prism.

4. Digital light deflector as claimed in claim 3, wherein the birefringent single prism is combined with a compensating prism.

5. Digital light deflector as claimed in claim 1, wherein the polarization separating element is a birefringent parallel plate which is oriented so that one of the beams of stray light and signal light enters the plate at an angle greater than the critical angle for total reflection and the other emerges from the parallel plate by refraction.

6. Digital light deflector as claimed in claim 1 which comprises a plurality of units which each include a plurality of deflector stages, wherein each unit is provided with an additional polarization switch and a polarization separating element.

* * * * *

UNITED STATES PATENT OFFICE
CERTIFICATE OF CORRECTION

Patent No. 3,819,939            Dated June 25, 1974

Inventor(s) MANFRED RAHLFF

It is certified that error appears in the above-identified patent and that said Letters Patent are hereby corrected as shown below:

ON THE TITLE PAGE

"[30]     Foreign Application Priority Data
      Sept. 15, 1971     Germany.............2146123"

should read:

--[30]     Foreign Application Priority Data

Sept. 15, 1971     Germany...........P.2146123.4--.

Signed and sealed this 24th day of September 1974.

(SEAL)
Attest:

McCOY M. GIBSON JR.            C. MARSHALL DANN
Attesting Officer               Commissioner of Patents